United States Patent
Wirola et al.

(10) Patent No.: US 11,375,336 B2
(45) Date of Patent: Jun. 28, 2022

(54) RADIO-BASED OCCUPANCIES IN VENUES

(71) Applicant: HERE Global B.V., Eindhoven (NL)

(72) Inventors: Lauri Aarne Johannes Wirola, Tampere (FI); Jari Tapani Syrjärinne, Tampere (FI)

(73) Assignee: HERE Global B.V., Eindhoven (NL)

( * ) Notice: Subject to any disclaimer, the term of this patent is extended or adjusted under 35 U.S.C. 154(b) by 59 days.

(21) Appl. No.: 16/962,169

(22) PCT Filed: Jan. 15, 2018

(86) PCT No.: PCT/EP2018/050866
§ 371 (c)(1),
(2) Date: Jul. 14, 2020

(87) PCT Pub. No.: WO2019/137624
PCT Pub. Date: Jul. 18, 2019

(65) Prior Publication Data
US 2021/0067901 A1 Mar. 4, 2021

(51) Int. Cl.
*H04W 4/021* (2018.01)
*G07C 9/38* (2020.01)

(52) U.S. Cl.
CPC ............ *H04W 4/021* (2013.01); *G07C 9/38* (2020.01)

(58) Field of Classification Search
CPC ................................. H04W 4/021; G07C 9/38
(Continued)

(56) References Cited

U.S. PATENT DOCUMENTS 7,499,679 B2  3/2009 Yang et al.
9,105,039 B2 * 8/2015 Kramer ............. G06Q 30/0261
(Continued)

FOREIGN PATENT DOCUMENTS

EP  2 000 962 A1  12/2008
EP  3306573 A1 *  4/2018  ............ H04L 67/22
(Continued)

OTHER PUBLICATIONS

Heuvel et al., Advances in Measuring Pedestrians at Dutch Train Stations Using Bluetooth, Wifi and Infrared Technology, Traffic and Granular Flow '15 (2016) pp. 11-18.
(Continued)

*Primary Examiner* — Mong-Thuy T Tran
(74) *Attorney, Agent, or Firm* — Alston & Bird LLP

(57) ABSTRACT

Inter-alia, a method is disclosed comprising: receiving at least one radio-based count information indicative of a number of radio devices residing at a venue or a part thereof; determining an occupancy information indicative of an occupancy of a number of persons residing at the venue or a part thereof, wherein the occupancy information is determined based at least partially on the radio-based count information and a correction information indicative of a relation between a true number of persons residing at the venue or a part thereof and the number of radio devices observable at the venue or a part thereof, wherein the correction information represents a ratio of a number of radio devices that have turned their radio communication interfaces on per persons residing at the venue or a part thereof; and storing the occupancy information. It is further disclosed an according apparatus, computer program and system.

20 Claims, 5 Drawing Sheets

(58) Field of Classification Search
USPC .................................................... 455/456.3
See application file for complete search history.

(56) References Cited

U.S. PATENT DOCUMENTS

| | | | |
|---|---|---|---|
| 9,516,474 | B2 | 12/2016 | Finnerty et al. |
| 9,612,589 | B1 | 4/2017 | Dawson-Haggerty et al. |
| 9,703,274 | B2 | 7/2017 | Li |
| 2012/0046044 | A1 | 2/2012 | Jamtgaard et al. |
| 2012/0315839 | A1 | 12/2012 | Mumcuoglu et al. |
| 2013/0273941 | A1* | 10/2013 | Grokop ............ H04N 21/42203 455/456.3 |
| 2014/0187270 | A1* | 7/2014 | Zinin .................... H04W 4/021 455/456.3 |
| 2016/0073229 | A1* | 3/2016 | Haro .................... H04W 4/021 455/456.3 |
| 2016/0161592 | A1 | 6/2016 | Wirola et al. |
| 2017/0206421 | A1 | 7/2017 | Pandey et al. |
| 2017/0331908 | A9 | 11/2017 | Grohman |
| 2018/0176726 | A1* | 6/2018 | Beal ........................ H04L 67/22 |
| 2018/0349808 | A1* | 12/2018 | Sahadi ................... G06Q 50/14 |
| 2019/0028852 | A1* | 1/2019 | Yamada ................ H04W 4/021 |
| 2019/0205843 | A1* | 7/2019 | Benrachi ................ H04W 4/33 |
| 2019/0208365 | A1* | 7/2019 | Benrachi .............. G06K 9/6223 |

FOREIGN PATENT DOCUMENTS

| | | | | |
|---|---|---|---|---|
| WO | WO2013/128081 A1 * | 9/2013 | ............. | G06Q 30/02 |
| WO | WO2018/186800 a1 * | 4/2017 | ............. | G06Q 30/02 |

OTHER PUBLICATIONS

International Search Report and Written Opinion for Application No. PCT/EP2018/050865, dated Dec. 11, 2018.

Versichele et al., The Use of Bluetooth for Analysing Spatiotemporal Dynamics of Human Movement at Mass Events: A Case Study of the Ghent Festivities, Applied Geography, vol. 32, No. 2 (Mar. 31, 2012) pp. 208-220.

* cited by examiner

RADIO-BASED OCCUPANCIES IN VENUES

CROSS-REFERENCE TO RELATED APPLICATIONS

This application is a national phase entry of International Application No. PCT/EP2018/050866, filed Jan. 15, 2018, the entire contents of which are incorporated herein by reference.

FIELD

The following disclosure relates to the field of occupancy monitoring, or more particularly relates to systems, apparatuses, and methods for determining occupancies of venues or parts thereof.

BACKGROUND

Indoor positioning requires novel systems and solutions that are specifically developed and deployed for this purpose. The "traditional" positioning technologies, which are mainly used outdoors, for instance satellite and cellular positioning technologies, cannot deliver such performance indoors that would enable seamless and equal navigation experience in both environments.

The required positioning accuracy (within 2 to 3 meters), coverage (~100%) and floor detection are challenging to achieve with satisfactory performance levels with the systems and signals that were not designed and specified for the indoor use cases in the first place. Satellite-based radio navigation signals simply do not penetrate through the walls and roofs for the adequate signal reception and the cellular signals have too narrow bandwidth for accurate ranging by default.

Several indoor-dedicated solutions have already been developed and commercially deployed during the past years, for instance solutions based on pseudolites (Global Positioning System (GPS)-like short-range beacons), ultrasound positioning, Bluetooth Low Energy (BLE) signals (e.g. High-Accuracy Indoor Positioning, HAIP) and Wi-Fi fingerprinting. What is typical to these solutions is that they require either deployment of totally new infrastructure (radio nodes or radio beacons, or tags to name but a few non-limiting examples) or manual exhaustive radio surveying of the buildings including all the floors, spaces and rooms. This is rather expensive and will take a considerable number of time to build the coverage to the commercially expected level, which in some cases narrowed the potential market segment only to very thin customer base, for instance for health care or dedicated enterprise solutions. Also, the diversity of these technologies makes it difficult to build a globally scalable indoor positioning solution, and the integration and testing will become complex if a large number of technologies needs to be supported in the consumer devices (e.g. smartphones).

For an indoor positioning solution to be commercially successful, that is, i) being globally scalable, ii) having low maintenance and deployment costs, and iii) offering acceptable end-user experience, the solution needs to be based on an existing infrastructure in the buildings and on existing capabilities in the consumer devices. This leads to an evident conclusion that the indoor positioning needs to be based on Wi-Fi- and/or Bluetooth (BT)-technologies that are already supported in every smartphone, tablet, laptop and even in the majority of feature phones. It is, thus, required to find a solution that uses the Wi-Fi- and BT-radio signals in such a way that makes it possible to achieve 2 to 3 meter horizontal positioning accuracy, close to 100% floor detection with the ability to quickly build the global coverage for this approach.

Further, a novel approach for radio-based indoor positioning that models for instance the Wi-Fi-radio environment (or any similar radio e.g. Bluetooth) from observed Received Signal Strength (RSS)-measurements as two-dimensional radio maps and is hereby able to capture the dynamics of the indoor radio propagation environment in a compressable and highly accurate way. This makes it possible to achieve unprecedented horizontal positioning accuracy with the Wi-Fi signals only within the coverage of the created radio maps and also gives highly reliable floor detection.

To setup indoor positioning in a building, the radio environment in the building needs to be surveyed. This phase is called radio mapping. In the radio mapping phase samples containing geolocation (like latitude-, longitude-, altitude-; or x-, y-, z- (floor) coordinates) and radio measurements (Wi-Fi and/or Bluetooth radio node identities and signal strengths). Having these samples allows understanding how the radio signals behave in the building. This understanding is called a radio map. The radio map enables localization capability to devices. When they observe varying radio signals, the signals can be compared to the radio map resulting in the location information.

The radio samples for the radio map may be collected with separate tools or crowd-sourced from the user devices. While automated crowd-sourcing can enable indoor localization in large amount of buildings, manual data collection using special tools may be the best option, when the highest accuracy is desired.

Yet another aspect of the modern Bluetooth radio node respectively beacon systems is beacon monitoring and management.

Hubs are deployed throughout the venue so that each beacon can communicate with at least one hub. The hubs, on the other hand, are connected to a monitoring/management server via a gateway hub, which is essentially a wired/wireless router. The hubs may be connected to the gateway hub through cable (e.g. Ethernet) or wirelessly (e.g. Wi-Fi). The gateway hub may for instance be connected to a beacon monitoring and/or management server.

The beacon monitoring refers to monitoring the beacon characteristics most typically via one-way communications. The beacons may e.g. periodically broadcast their battery states, which transmissions are captured by the hubs and further routed to the monitoring/management server for analysis and visualization. The beacon management, on the other hand, refers to being able to perform two-way communication with the hubs. With a beacon management system e.g. the beacon transmit power can be re-configured remotely or the advertisement message changed, when needed.

However, due to the circumstance that office space is becoming more and more expensive, in particular in busy city centers, facility managers want to optimize the space usage. For being able to perform such an optimization of office space, key data of how the space is being used, what is the occupancy (e.g. a number of persons in a specified area of a venue), what is the occupancy ratio (e.g. the ratio between the true number of persons in a specified area of the venue and the possible number of persons in the specified area of the venue), or the like needs to be determined reliably.

SUMMARY OF SOME EXEMPLARY EMBODIMENTS

For collecting such information like how the space is being used, and/or occupancy ratio, specialized sensors that are based on image processing and/or infrared sensors may be used. This has the disadvantage that costly specialized sensors need to be deployed throughout the area for that the information should be collected. Further, radio sensing can be used. Radio sensing can be inaccurate since an unknown fraction of people inside of the area for that the information should be collected might have turned the radio of their devices on or off.

It is thus, inter alia, an object of the invention to provide a reliable determining of at least one occupancy information for at least a part of a venue for that such information should be determined.

According to a first exemplary aspect of the present invention, a method is disclosed, the method comprising:
  receiving at least one radio-based count information indicative of a number of radio devices residing at a venue or a part thereof;
  determining an occupancy information indicative of an occupancy of a number of persons residing at the venue or a part thereof, wherein the occupancy information is determined based at least partially on the radio-based count information and a correction information indicative of a relation between a true number of persons residing at the venue or a part thereof and the number of radio devices observable at the venue or a part thereof, wherein the correction information represents a ratio of a number of radio devices that have turned their radio communication interfaces on per persons residing at the venue or a part thereof; and
  storing the occupancy information.

This method may for instance be performed and/or controlled by an apparatus, for instance a server. Alternatively, this method may be performed and/or controlled by more than one apparatus, for instance a server cloud comprising at least two servers. The server may for instance be an occupancy monitoring server providing occupancy monitoring services for a specific venue, or for at least a part of the specific venue, or for a plurality of venues, or for at least a respective part of the plurality of venues. Additionally or alternatively, this method may for instance be performed and/or controlled by so-called radio map and positioning server in addition to providing radio map and positioning services, e.g. determining location estimate(s), or providing radio maps.

According to a further exemplary aspect of the invention, a computer program is disclosed, the computer program when executed by a processor causing an apparatus, for instance a server, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a second exemplary aspect of the present invention, a method is disclosed, the method comprising:
  gathering a visual information indicative of a number of persons residing at a venue or a part thereof;
  gathering an initial radio-based count information indicative of a number of radio devices residing at the venue or a part thereof;
  outputting the visual information and the initial radio-based count information.

This method may for instance be performed and/or controlled by an apparatus, for instance a hub. Such a hub may for instance be deployed in a venue. Such a hub may for instance be part of an indoor positioning and/or floor detection system of the venue. Further, such a hub may for instance comprise or be connectable to at least one optical sensor for gathering the visual information. Such a hub may for instance comprise or be connectable to a receiver and/or transceiver according to wireless communication specification (e.g. Bluetooth, Bluetooth Low Energy, and/or Wi-Fi, to name but a few non-limiting examples) for gathering the initial radio-based count information.

According to a further exemplary aspect of the invention, a computer program is disclosed, the computer program when executed by a processor causing an apparatus, for instance a server, to perform and/or control the actions of the method according to the second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the second exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a third exemplary aspect of the present invention, a method is disclosed, the method comprising:
  gathering a radio-based count information indicative of a number of radio devices residing at a venue or a part thereof; and
  outputting the gathered radio-based count information.

This method may for instance be performed and/or controlled by an apparatus, for instance a radio node. Such a radio node may for instance be deployed in a venue. Such a radio node may for instance be part of an indoor positioning and/or floor detection system of the venue. Further, such a radio node may for instance comprise or be connectable to a receiver and/or transceiver according to wireless communication specification (e.g. Bluetooth, Bluetooth Low Energy, and/or Wi-Fi, to name but a few non-limiting examples) for gathering the radio-based count information. Such a radio node may for instance be a beacon or WLAN access point. This method may for instance be performed and/or controlled by an apparatus, for instance a hub that may additionally perform and/or control the method according to the second exemplary aspect of the present invention.

According to a further exemplary aspect of the invention, a computer program is disclosed, the computer program when executed by a processor causing an apparatus, for instance a server, to perform and/or control the actions of the method according to the third exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the third exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the third exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a fourth exemplary aspect of the invention, a system is disclosed, comprising:
  a first apparatus (e.g. a server) according to the first exemplary aspect of the present invention as disclosed above, a second apparatus (e.g. a hub) according to the second exemplary aspect of the present invention as disclosed above, and a third apparatus (e.g. a radio node) according to the third exemplary aspect of the present invention as disclosed above, which together are adapted to perform and/or control the methods according to the first, second and third exemplary aspects of the present invention.

In the following, exemplary features and exemplary embodiments of all aspects of the present invention will be described in further detail.

The venue may for instance be a building, shopping mall, office building or office complex, public accessible location (e.g. station, airport, university, or the like), to name but a few non-limiting examples.

The at least one radio-based count information may for instance be received from a radio node of the venue (by the first apparatus). One or more of such radio nodes may for instance be deployed throughout the venue. The one or more radio nodes may for instance be comprised by the venue, e.g. by an infrastructure of the venue. For instance, the one or more radio nodes may for instance be deployed throughout the venue so that a coverage area that is related to the venue or a part thereof is established.

The coverage area within the meaning of the present invention relates to a certain area or space in the venue, in that a wireless-based communication between the third apparatus and another entity, e.g. a radio device or a hub, to name but a few non-limiting examples can take place. Since the third apparatus observes if one or more radio devices transmit respective (radio) signals, there may for instance be no need for an actual communication connection between the third apparatus and the other entity (e.g. the radio device) since the third apparatus may monitor the (radio) signals.

Whether or not a respective (radio) signal that is transmitted by a respective radio device is observable by the third apparatus depends, at least partially, on the transmission power (also referred to as Tx power) of the respective radio device. For instance, some radio devices may for instance have a relatively low Tx power so that the third apparatus may observe this respective radio device in case it is relatively close to the third apparatus (e.g. the radio device is only a short distance away from the third apparatus). The relatively low Tx power may for instance be compared to a radio device having a higher Tx power so that the third apparatus may observe this respective radio device even in case it is further away than the short distance of the aforementioned case.

According to an exemplary embodiment of the all aspects of the present invention, the part of the venue is a floor, room, or pre-defined area or space of or within the venue. The part of the venue may for instance be a floor, space, open area, room, shop, entrance hall, meeting room, office room, or the like of the venue, to name but a few non-limiting examples.

A respective radio node of the one or more radio nodes may for instance be a beacon used for indoor positioning and/or floor detection. The radio nodes may for instance be configured according to BT- (Bluetooth) and/or BLE- (Bluetooth Low Energy) specification, or may for instance be Wi-Fi Access Points for indoor positioning and/or floor detection, e.g. according to WLAN- (Wireless Local Area Network) specification. Indoor positioning and/or floor detection may for instance be performed based on a radio map. A respective radio node of the one or more radio nodes may for instance comprise or be connectable to a transceiver, e.g. according to BT-, BLE-, and/or WLAN-specification to provide wireless-based communication.

A respective radio device may for instance be a (mobile) terminal (e.g. a smartphone, tablet, navigation device, to name but a few non-limiting examples). The radio device may for instance be portable (e.g. weigh less than 5, 4, 3, 2, or 1 kg). The radio device may for instance comprise or be connectable to a display for displaying information, e.g. a map and/or a radio map of the venue or a part thereof. The radio device may for instance be configured to perform indoor navigation and/or positioning and/or floor detection based on such a radio map. The radio device may for instance comprise or be connectable to means for outputting sound, e.g. in the form of spoken commands or information. The radio device may for instance comprise or be connectable to one or more sensors for determining the radio devices position, such as radio-based indoor positioning from e.g. observed RSS- (received signal strength) measurements as e.g. a horizontal position and/or floor level (e.g. as vertical position), e.g. in the venue.

The at least one radio-based count information is indicative of a number of radio devices residing at the venue or a part thereof. Thus, the number of radio devices residing at the venue or a part thereof corresponds to the number of radio devices from that one or more signals are observable. The one or more signals may for instance be observable by a respective radio node deployed in the vicinity of said radio devices. The one or more signals may for instance be radio signals, e.g. signals transmitted wireless, e.g. according to BT-, BLE-, or WLAN communication standard. Since the number of radio devices residing at the venue or the part thereof correlates to the number of the one or more signals that are sent by said radio devices, the occupancy information to be determined does not simply correspond to this number of radio devices. There may for instance be further one or more persons at the venue or the part thereof, at which the at least one radio-based count information was gathered prior to the receiving of said radio-based count information, wherein those one or more further persons may for instance not carry a radio devices at all, or alternatively may for instance have turned off the transmission of one or more signals by the respective radio device that is carried by the respective person of the one or more persons. In the following, this is also referred to as mobile terminal(s) that have its (their) radio communication interface turned off.

The occupancy of the venue of a part thereof may for instance be represented by a number of persons residing at the venue or a part thereof. Additionally or alternatively, the occupancy of the venue or a part thereof may for instance be represented by a number of persons residing at the venue or a part thereof at a given time, or over a pre-determined or determined according to pre-defined rules time interval (e.g. represented by a time stamp information, e.g. comprised by or associated with the occupancy information). Additionally or alternatively, the occupancy of the venue or a part thereof may for instance be an occupancy ratio between the true or current number of persons in a specified area of the venue and the possible number of persons in the specified area of the venue (e.g. over a pre-determined time interval) for the venue or a part thereof. The possible number of persons in the specified area of the venue may for instance be understood as a full utilization of the capacity of the specified area of the venue. Additionally or alternatively, the occupancy of the venue or a part thereof may for instance be a time or time interval (e.g. represented by a time stamp information, e.g. comprised by or associated with the occupancy information) at which no persons are residing in the venue or a part thereof (also referred to as vacancy of the venue or a part thereof). Further, the occupancy may for instance be associated with an infrastructure element of the venue or a part thereof, e.g. the occupancy of a number of work places, the occupancy of a number of seating areas or the like to name but a few non-limiting examples.

The occupancy information is determined based at least partially on the at least one radio-based count information and a correction information. The correction information is indicative of a relation between a true number of persons residing at the venue or a part thereof at which the at least one radio-based count information was gathered prior to the receiving of the at least one radio-based count information. The correction information may for instance represent a factor (e.g. a value) of a ratio of an average number of radio devices per persons. Thus, it may for instance be known that a certain part of the persons residing at the venue or a part thereof have the transmission of one or more (radio) signals transmitted by their respective radio device turned off, or may not carry such a respective radio device at all. The determining of the occupancy information may for instance be a calculation of multiplying the number of radio devices residing at the venue or a part thereof (according to the received at least one radio-based count information) by the correction information.

For instance, the correction information may for instance represent a value that e.g. 20% of the persons residing at the venue or a part thereof may for instance not carry a respective radio device, or alternatively may carry a respective radio device but have the transmission of one or more (radio) signals by the respective radio device turned off. The occupancy information may then for instance be determined by multiplying the number of radio devices residing at the venue or a part thereof (according to the received at least one radio-based count information) by the correction information representing in the aforementioned example e.g. a value of 1.25. Thus, the true number of persons residing at the venue or a part thereof may in this non-limiting example be 25% higher than the number of radio devices residing at the venue or a part thereof, wherein from these radio devices one or more signals are observable at the venue or the (specific) part thereof.

The occupancy information is then stored, e.g. in a memory. Such a memory may for instance be comprised by the first apparatus performing and/or controlling the method according to the first exemplary aspect of the present invention, and/or may for instance be connectable to this first apparatus. Such a memory may for instance further comprise a database, wherein the determined occupancy information can be stored. Further, the database may for instance comprise at least one reference associated with the determined occupancy information and a location of the venue or a part thereof, so that a relation between the occupancy information and the location in the venue or a part thereof, for which location the occupancy information was determined, is known.

Further, the stored occupancy information may for instance be associated with a time stamp information indicative of a certain date and/or date at which the occupancy information was determined. Further, multiple instances of occupancy information determined for the same venue or part thereof, but associated with different time stamp information may for instance enable to acquire a history of the occupancy and/or occupancy ratio at the venue or the part thereof.

According to an exemplary embodiment of the first exemplary aspect of the present invention, a location information is received together with the radio-based count information, wherein the location information is indicative of a location of an apparatus of the venue from that the at least one radio-based count information is received.

The location in the venue or a part thereof, for which the occupancy information was determined, may for instance be represented by the location information. The location information may for instance be indicative of a certain room, floor, area, open space or the like of the venue.

The location information may for instance be or represent one or more identifiers of the respective radio node of the venue, e.g. WLAN access points. The location information may for instance be in the form of a BSSID (Basic Service Set Identifier) or a MAC (Media-Access-Control) address of the respective WLAN access point. Further, the location information may for instance be or represent a SSID (Service Set Identifier) of the respective radio node.

Further, the location may for instance be or represent one or more identifiers of the respective radio node of the venue, e.g. beacons (e.g. BT- and/or BLE-beacons). The location information may for instance be in the form of a UUID (Universally Unique Identifier), and/or a MAC address of the respective beacon.

The location in the venue or a part thereof of the apparatus (e.g. a third apparatus; radio node (e.g. WLAN access point, beacon)) that gathered the at least one radio-based count information and then transmits this at least one radio-based count information together with the location information may be known. In this way, e.g. the determined and then stored occupancy information may for instance be associated with the location of the apparatus that gathered the at least one radio-based count information in the venue or a part thereof.

According to an exemplary embodiment of the first exemplary aspect of the present invention, the determined occupancy information is output. The occupancy information may for instance be output, e.g. to one or more further first apparatuses (e.g. one or more servers), to one or more second apparatus (e.g. one or more hubs), or to another apparatus that transfers the occupancy information to the one or more further first apparatuses, and/or to the one or more second apparatuses.

The occupancy information may for instance be output based on a request that is received prior to the outputting. Such a request may for instance request the occupancy information for a (e.g. specific) venue or a part thereof to be transmitted.

Such a request may for instance be related to a provision of one or more occupancy information, e.g. stored in a memory by the first apparatus, as a service.

Based on the occupancy information, it is for instance possible to analyze how the venue or a part thereof (e.g. a space in the venue) is being used, e.g. what is the occupancy and/or occupancy ratio of a specified area of the venue, or the like to name but a few non-limiting examples. Based on the occupancy information, e.g. facility manager(s) of the venue may for instance optimize the usage of the venue or a part thereof (e.g. a space in the venue).

According to an exemplary embodiment of the first and/or second exemplary aspect of the present invention, the correction information is determined based at least partially on a visual count information indicative of a number of persons residing at the venue or a part thereof and an initial radio-based count information indicative of a number of radio devices residing at the venue or a part thereof.

The visual information and the initial radio-based count information may for instance be gathered for the same specified area of the venue. Further, the visual information and the initial radio-based count information may for instance be gathered at the same time or time interval. In this way, a correction information representing an accurate factor (e.g. a value) of a ratio of an average number of radio devices per persons can be determined.

The visual count information may for instance represent a true number of persons residing at the venue or a part thereof. The visual count information may for instance represent the true number since the visual count information is obtained by visual cues. Such a visual cue may for instance be a counting of the true number of persons residing at the venue or a part thereof, e.g. based on visual information, e.g. an image, video, or live view recorded and representing a certain area of the venue (e.g. the part of the venue), or the venue as a whole. The visual count information may for instance be determined, e.g. by the first apparatus or by the second apparatus, based at least partially on a visual information, e.g. gathered by at least one optical sensor. Such a visual information may for instance be gathered (in case of the second apparatus) or received (in case of the first apparatus) prior to the determining of the visual count information.

Further, the initial radio-based count information may for instance represent the number of radio devices from which one or more signals are observable at the certain area of the venue (e.g. the part of the venue), or the venue as a whole.

The certain area of the venue (e.g. the part of the venue), or the venue as a whole is the same as the certain area of the venue (e.g. the part of the venue), or the venue as a whole at which the visual count information was obtained. To ensure that the correction information that is determined based at least partially on the visual count information and the initial radio-based count information relates to the true average ratio of the number of radio devices per persons residing at the venue or a part thereof, both the visual count information and the initial radio-based count information may for instance be obtained simultaneously, e.g. at the same date and time, or over a same pre-determined or determined according to pre-defined rules time interval. In this way, it may for instance be ensured that the correction information represents the most accurate ratio of the average number of radio devices per persons.

According to an exemplary embodiment of the first exemplary aspect of the present invention, a plurality of pieces of correction information are determined, wherein each of the plurality of pieces of correction information are determined based on a respective visual count information indicative of a number of persons residing at a venue or a part thereof, and a respective initial radio-based count information indicative of a number of radio devices residing at the venue or a part thereof. The respective visual count information and the respective initial radio-based count information may for instance be gathered by the same apparatus (e.g. a respective second apparatus). A plurality of such second apparatuses may for instance be deployed throughout the venue.

In case a plurality of pieces of correction information are determined, it will be understood that each aspect described in this specification with respect to a "correction information" may apply to each of the plurality of pieces of correction information as well.

According to an exemplary embodiment of the first exemplary aspect of the present invention, an overall correction information may for instance be determined based, at least partially, on the plurality of pieces of correction information that are associated with the venue.

The plurality of pieces of correction information may for instance be stored, e.g. in the memory comprised by or connectable to the first apparatus. The plurality of pieces of correction information may for instance be determined (and e.g. stored) prior to the determining of the overall correction information. Such an overall correction information may for instance be indicative of a relation between a true number of persons residing at the whole venue and the number of radio devices observable at the whole venue. Such an overall correction information may for instance represent a ratio of a number of radio devices per persons.

The overall correction information may for instance be determined (e.g. calculated) by determining a mean average, or arithmetic average based on the plurality of pieces correction information. Each of the plurality of pieces of correction information may for instance be determined based on a pair of visual count information and initial radio-based count information that are received by the first apparatus, wherein each of the received pairs of visual count information and initial radio-based count information stem from a respective second apparatus.

Further, as is described with more detail below, the correction information may for instance be determined on part of the second apparatus that gathered a respective visual information and a respective initial radio-based count information. In this case, the correction information that is determined on part of the respective second apparatus may for instance be received by the first apparatus.

It will be understood that the aforementioned overall correction information may for instance be determined on a plurality of those received correction information as well.

Further, some second apparatus deployed in the venue may be enabled to determine a correction information, and thus be enabled to output the determined correction information to the first apparatus, and some other second apparatus(es) deployed throughout the venue may not be enabled to determine a respective correction value. It will be understood that the overall correction information may for instance be determined based on one or more correction information that are determined by the first apparatus (and then stored) and one or more correction information that are received by the first apparatus. Those one or more correction information that are received, are not needed to be determined by the first apparatus. Those one or more correction information that are received by the first apparatus may for instance be stored, e.g. in the memory, by the first apparatus upon the reception of the respective correction information.

According to an exemplary embodiment of all aspects of the present invention, the occupancy information represents one or more occupancies, wherein each occupancy of the one or more occupancies is associated with a certain part of the venue.

Additionally, the occupancy information represents one or more occupancy ratios, wherein each occupancy ratio of the one or more occupancy ratios is associated with a certain part of the venue (e.g. a specified area of the venue).

For instance, one piece of occupancy information may comprise more than one occupancies, and/or occupancy ratios. Each of the more than one occupancies, and/or occupancy ratios may for instance be determined for a different venue or a different part of the same venue. Further, each of the more than one occupancies, and/or occupancy ratios may for instance be associated with a time stamp information, as described above.

For instance, based on a received request for being provided with an occupancy information, or with a plurality of pieces of occupancy information, wherein the occupancy information, or each of the plurality of pieces of occupancy information is respectively indicative of the occupancy, and/or occupancy ratio with a number of persons residing at the venue or a (certain) part of the venue, can be provided in response to the request, e.g. as a service.

For instance, the occupancy information comprising a plurality of occupancies, occupancy ratios, or a plurality of pieces of occupancy information, wherein each of the plurality of occupancy information may for instance be associated with a certain part of the venue, may for instance be used to generate an occupancy map. Such an occupancy map may contain or represent a respective occupancy and/or occupancy ratio for an area of the venue in that a respective coverage area is established.

Based on the occupancy map, it may for instance be determined, whether certain area(s) of the venue are used to their optimum or not. Further, such an occupancy map may for instance comprise more than one occupancy and/or occupancy ratio associated to the same certain area, but each of the more than one occupancy and/or occupancy ratios that is associated with the same area is further associated with a different time stamp information. In this way, it may for instance be determined, how certain area(s) of the venue are occupied e.g. throughout a certain period of time (e.g. day, month, year, weekend, or the like to name but a few non-limiting examples.

Such an occupancy map may for instance be provided for further usage.

According to an exemplary embodiment of the first exemplary aspect of the present invention, the visual count information and the initial radio-based count information are received from an apparatus that gathered a visual information (that is used for determining the visual count information) and an initial radio-based count information prior to the receiving of the visual count information and the initial radio-based count information, or wherein a visual information and the initial radio-based count information are received from an apparatus that gathered the visual information and the initial radio-based count information prior to the receiving of the visual information and the initial radio-based count information, and wherein the visual count information is determined based at least partially on the received visual information.

The visual information and the initial radio-based count information may for instance be gathered (e.g. measured) by the same apparatus.

In some exemplary embodiments according to all aspects of the present invention, the apparatus that gathered the visual information may for instance determine the visual count information based at least partially on the gathered visual information. Then, this determined visual count information may for instance be output by the apparatus that gathered the visual information, e.g. to the first apparatus.

In some other exemplary embodiments according to all aspects of the present invention, the apparatus that gathered the visual information may not be enabled to determine the visual count information. In those cases, the visual information may for instance be output by the apparatus that gathered the visual information, e.g. to the first apparatus. Then, the first apparatus may for instance determine the visual count information based at least partially on the received visual information.

It will be understood that the outputting may not be a transmission using a direct communication connection between the apparatus (e.g. the second apparatus) that gathered the visual information and the first apparatus, but may be via another entity that transmits the output information to the first apparatus.

According to an exemplary embodiment of the first exemplary aspect of the present invention, the first apparatus is or is part of server or a server cloud.

The first apparatus, receiving the radio-based count information, may for instance be a so-called occupancy monitoring server. Upon receiving at least one radio-based count information, the server may for instance perform and/or controlled the method according to the first exemplary aspect of the present invention.

The visual information may for instance be gathered by at least one sensor, e.g. at least one optical sensor.

The at least one sensor may for instance be comprised by the second apparatus, or alternatively may be connectable to the second apparatus. The at least one sensor may for instance enable the visual information to be gathered. Such a visual information may for instance be represented by an image, video, live image, or live video, to name but a few non-limiting examples. For determining the true number of persons residing at a venue or a part thereof, the visual information may for instance be analyzed, e.g. by an optical person recognition to name but one non-limiting example. The result of the analyzing of the visual information may for instance be a respective visual count information. The visual count information may for instance be determined based at least partially on the visual information. The visual count information may for instance be output, e.g. in addition to the visual information, or as an alternative to the visual information.

Alternatively or additionally, in order to determine the true number of persons residing at the venue or a part of the venue, the number of persons may for instance be determined manually, e.g. by counting the number of persons residing at the venue or a part of the venue. Then, the counted number of persons may for instance be entered into the second apparatus by an operator, so that the entered number of persons can be set to represent the visual count information.

The initial radio-based count information may for instance be gathered simultaneously to the visual count information. Therefore, the visual count information and the initial radio-based count information may for instance be gathered by the same device, at hand the second apparatus. For gathering the initial radio-based count information, a receiver or transceiver comprised by or being connectable to the second apparatus may for instance be used. For gathering the initial radio-based count information, the number of different radio signals stemming from radio devices which signal(s) are observable at the location of the second apparatus may for instance be counted. Since a respective radio device may for instance transmit more than one (radio) signals, e.g. one signal is transmitted by a BT-transceiver of the respective radio device and other signal is transmitted by a WLAN-transceiver of the respective radio device, an identifier that may for instance be comprised by the transmitted signal(s) of the radio device may for instance be used for identifying the respective radio device.

The visual information (optionally or alternatively the visual count information) and the initial radio-based count information are then output. The visual information (optionally or alternatively the visual count information) and the initial radio-based count information may for instance be output, e.g. to one or more first apparatuses (e.g. one or more servers), to one or more second apparatus (e.g. one or more hubs), or to another apparatus that transfers the visual information (optionally or alternatively the visual count information) and the initial radio-based count information to at least one first apparatus, and/or to the one or more second apparatuses.

Further, the visual information (optionally or alternatively the visual count information) and the initial radio-based count information may for instance be output together with an identifier information enabling the second apparatus (that gathered both the visual information and the initial radio-based count information) to be identified.

According to an exemplary embodiment of the second exemplary aspect of the present invention, the method further comprises:
  determining a correction information indicative of a relation between the true number of persons residing at the venue or a part thereof and the number of radio devices observable at the venue or a part thereof, wherein the correction information represents a ratio of number of radio devices per person.

The determined correction information may for instance be the same as the one determined by the method according to the first exemplary aspect of the present invention. For instance, the second apparatus may be a hub or be a part of such a hub.

Such a hub may for instance perform and/or control the determining of the correction information as well.

Further, the correction information may for instance comprise or be associated with an identifier of the second apparatus that gathered the visual information and the initial radio-based count information prior to the determining of the correction information.

The determined correction information is then output, e.g. from the second apparatus to the first apparatus. In this way, the first apparatus may not need to determine the correction information based on the visual count information and the initial radio-based count information that are gathered by a respective second apparatus, but is provided with an already determined correction information.

According to an exemplary embodiment of the second exemplary aspect of the present invention, the visual information is gathered by at least one optical sensor.

Such an optical sensor may for instance be configured to gather such a visual information. The optical sensor may for instance be a light and/or an infrared sensor. Thus, such an optical sensor may for instance be configured to detect light (e.g. in the frequency range of the visual spectrum) and/or electromagnetic radiation, in particular in the frequency range of infrared, visual light, and/or above the visual light frequency range, e.g. in the frequency range of ultraviolet. Further, the at least one sensor for gathering the visual information may for instance be thermal, radar, and/or sonar sensor.

Based on the gathered visual information of the at least one optical sensor, the visual count information may for instance be determined. For instance, the gathered visual information of the at least one optical sensor may for instance represent an image of a certain part of the venue. This gathered information may for instance be analyzed, e.g. by a digital image processing. Such a digital image processing may for instance comprise a face or person recognition. As a result of such a digital image processing, a number of persons represented by the gathered visual information of the at least one optical sensor may for instance be determined. Such an analyzing of the visual information gathered by the at least one sensor may for instance be performed and/or controlled by an artificial neural network. For instance, by analyzing example images that have been manually labeled as "person" or "no person", such an artificial neural network may for instance be used to identify a number of persons in an image, or multiple images such as a video.

According to an exemplary embodiment of the second exemplary aspect of the present invention, the initial radio-based count information is gathered by at least one communication interface according to Wi-Fi and/or Bluetooth communication standard.

The at least one communication interface may for instance be a transceiver, e.g.

according to BT-, BLE-, and/or WLAN-specification to provide wireless-based communication. The at least one communication interface may for instance be comprised by or being connectable to the second apparatus.

The at least one communication interface may for instance enable a number of radio devices residing at the venue or a part thereof to be determined. The number of radio devices may for instance be determined based on one or more (radio) signals that are transmitted by the respective radio device of the plurality of radio devices. For instance, the one or more (radio) signals transmitted by a respective radio device may for instance comprise, or at least a part of the transmitted one or more (radio) signals, or represent, at least a part of the transmitted one or more (radio) signals, an identifier enabling the respective radio device to be identified. This enables a plurality of radio device whose one or more signals are observable (e.g. receivable) by the second apparatus to be differentiated from each other.

According to an exemplary embodiment of the second exemplary aspect of the present invention, the second apparatus is a wire-based and/or wireless hub, or a radio node, e.g. comprising the at least one optical sensor.

The radio-based count information may for instance be gathered based, at least partially, on one or more (radio) signals that are transmitted by one or more radio devices residing within the coverage area established between the respective radio device of the one or more radio devices and the third apparatus. Thus, the one or more radio devices are located in the vicinity of the third apparatus. As described above, based, at least partially, on the one or more (radio) signals that are observable (e.g. receivable) by the third apparatus, a number of radio devices located within the venue or a part thereof that is covered by the coverage area may for instance be determined. The coverage area within the meaning of the present invention relates to a certain area or space in the venue, in that a wireless-based communication between the third apparatus and another entity, e.g. a radio device or a hub, to name but a few non-limiting examples can take place.

The third apparatus may for instance comprise or being connectable to at least one communication interface. Such a communication interface may for instance be a transceiver, e.g. according to BT-, BLE-, and/or WLAN-specification to provide wireless-based communication.

According to an exemplary embodiment of the third exemplary aspect of the present invention, a location information indicative of the location of the third apparatus of the venue is outputted together with the gathered radio-based count information.

Alternatively, the radio-based count information comprises such a location information. Such a location information may for instance be an identifier of the third apparatus, e.g. a UUID (in case that the third apparatus is a beacon), or SSID (in case the third apparatus is a Wi-Fi access point), or a MAC address. The location information may for instance enable the third apparatus to be identified. Further, based on the location information, it is enabled to determine the location (e.g. latitude, longitude, optionally altitude, or x-, y-, optionally z- (floor level) coordinate) of the third apparatus in the venue. Further, the location information may for instance enable the certain part of the venue that is covered by the coverage area that is established between a respective radio device and the third apparatus to be determined.

According to an exemplary embodiment of the third exemplary aspect of the present invention, the initial radio-based count information is gathered by at least one communication interface according to Wi-Fi and/or Bluetooth communication standard.

As described above in conjunction with the second exemplary aspect of the present invention, the at least one communication interface according to Wi-Fi and/or Bluetooth communication standard may for instance enable a number of radio devices residing at the venue or a part thereof to be determined. The number of radio devices may for instance be determined based on one or more (radio) signals that are transmitted by the respective radio device of the plurality of radio devices.

According to an exemplary embodiment of the third exemplary aspect of the present invention, the third apparatus is a radio node according to the Bluetooth and/or Wi-Fi communication standard.

For instance, the third apparatus may for instance be BT- and/or BLE beacon (e.g. a so-called Eddystone or iBeacon to name but a few non-limiting examples), or a Wi-Fi access point, or a combination thereof.

The method according to the first exemplary aspect of the present invention, the method according to the second exemplary aspect of the present invention and the method according to the third exemplary aspect of the present invention may for instance be performed and/or controlled together. These three methods may for instance be performed and/or controlled by a system according to the fourth exemplary aspect of the present invention.

It can be kept track of unique and maybe changing occupancy information associated with a venue or a part thereof.

The one or more radio nodes that are deployed in the venue may for instance enable indoor positioning and/or floor detection to be performed and/or controlled. This may for instance be performed and/or controlled based on a radio map. According to the present invention, such an indoor positioning and/or floor detection environment may further be used to determine one or more occupancy information associated with the venue or a part thereof.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
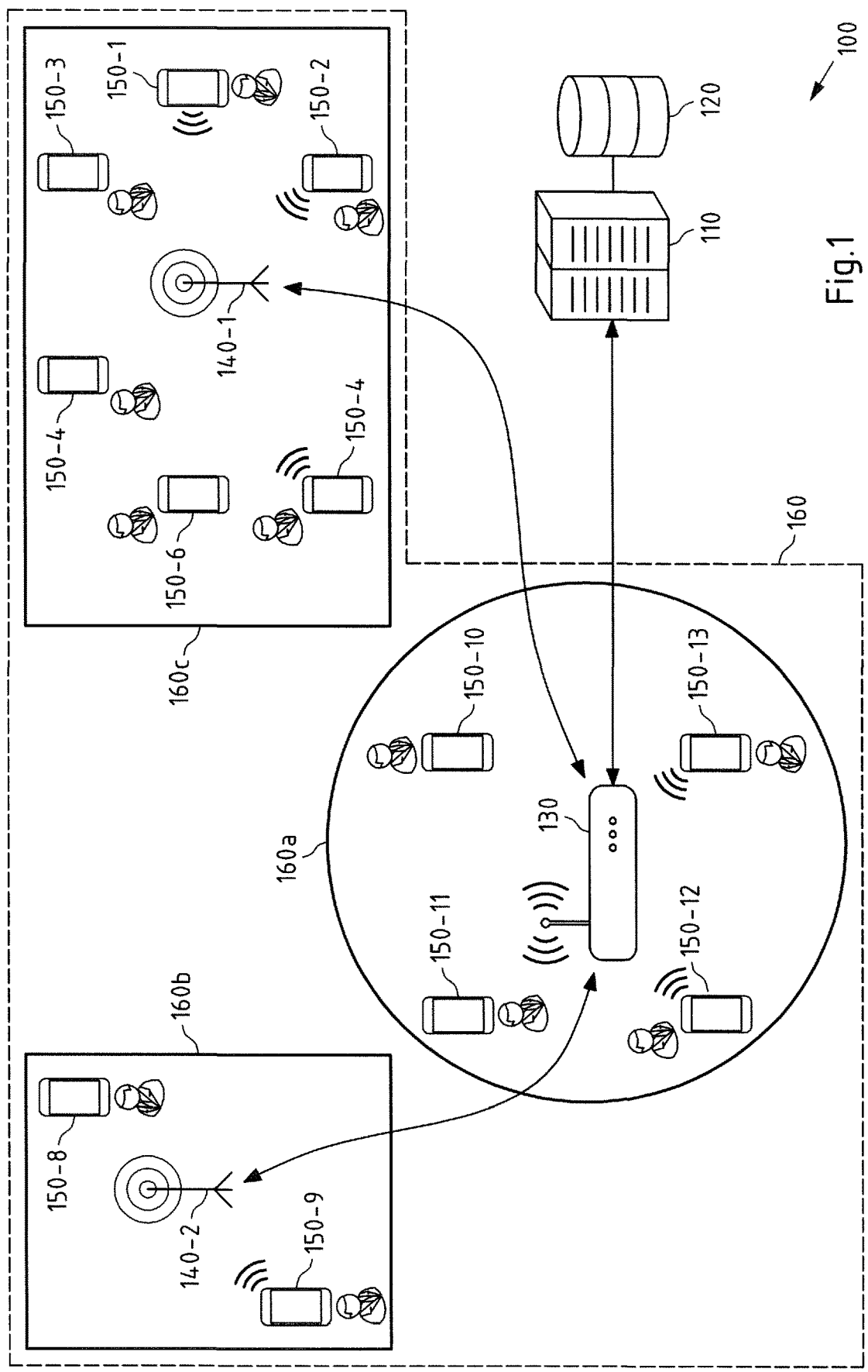
FIG. 1 a schematic block diagram of an example embodiment of a system according to the fourth exemplary aspect of the present invention.

FIG. 1 shows a schematic high-level block diagram of a system according to the fourth exemplary aspect of the present invention.

System 100 comprises a server 110 (at hand an occupancy monitoring server 110), and an optional database 120. Database 120 may be comprised by or connected to the server 110, e.g. via a communication network (e.g. the Internet to name but one non-limiting example and not shown in FIG. 1). The server 110 may be configured to perform and/or control an example method according to the first exemplary aspect of the present invention. The server 110 may alternatively be embodied as a server cloud, e.g. at least two servers providing services together, and being connected to each other, e.g. via a communication network (not shown in FIG. 1), e.g. the Internet.

System 100 comprises a plurality of radio nodes 140-1 and 140-2 (e.g. according to WLAN, BT or BLE communication standard). The radio nodes 140 may be configured to perform and/or control an example method according to the third exemplary aspect of the present invention. Radio nodes 140-1 and 140-2 may for instance be WLAN access points or BT- and/or BLE-beacons. The radio nodes 140-1 and 140-2 are deployed in the venue 160. At hand, radio node 140-1 is deployed in the part 160c of the venue 160. The venue 160 may for instance be an office building. At hand, the part 160c of the venue 160 is a room, e.g. meeting room of an office building. Further, radio node 140-2 is deployed in the part 160b of the venue. At hand, the part 160b of the venue 160 is another room, e.g. an office room. System 100 may for instance comprise a plurality of further radio nodes 140 (not shown in FIG. 1).

System 100 comprises a plurality of radio devices 150, at hand different mobile terminals 150-1 to 150-13. Each of the mobile terminals 150 is carried by a person currently residing in the venue 160. As is indicated by the wireless signal emitting waves drawn at some of the mobile terminals (e.g. at mobile terminal 150-9 residing in the part 160b of the venue 160), but not at all of the mobile terminals, some of the mobile terminals 150 have turned the radio communication interfaces comprised by each of the mobile terminals 150 off, some other mobile terminals have turned the radio communication interfaces on.

System 100 further comprises a hub 130. The hub 130 may be configured to perform and/or control an example method according to the second exemplary aspect of the present invention. Hub 130 is deployed in part 160a of the venue 160. At hand, part 160a of the venue is an open space of the office building. The venue 160 may for instance comprise one or more further of such hubs that are not shown in FIG. 1.

Mobile terminals 150 may sent (e.g. transmit) one or more signals that are observable (e.g. receivable) by at least one of the radio nodes 140-1 and 140-2 deployed throughout the venue 160, and/or by the hub 130 deployed in the venue 160. Based at least partially on these one or more signals, radio nodes 140-1 and 140-2, and/or hub 130 may determine a radio-based count information indicative of the number of mobile terminals 130 residing within the vicinity of the respective radio node 140-1, 140-2 and/or hub 130, wherein the vicinity of the respective radio node 140-1, 140-2 and/or hub 130 may equal the coverage area in which signals from the mobile terminals 150 are observable by the respective radio node 140-1, 140-2 and/or the hub 130.

Hub 130 may for instance comprise at least one optical sensor (e.g. sensor 670 of apparatus 600 of FIG. 6) that may be used to gather a visual information. For instance, hub 130 may gather a visual information by the at least one optical sensor, wherein the visual information is indicative of e.g. an image of the part 160a of the venue 160 representing all of the persons currently residing in the part 160a of the venue 160.

Based at least partially on the visual information, a visual count information may for instance be determined. This visual count information may represent a true number of persons residing in the part 160a of the venue 160, wherein from this part 160a of the venue 160 the visual information was gathered. The determining of the visual count information may for instance be performed and/or controlled by the hub 130. Alternatively, the determining of the visual count information may for instance be performed and/or controlled by the server 110. It will be understood that the server 110 may receive the visual information from the hub 130 prior to the determining of the visual count information.

Further, for instance simultaneously to the gathering of the visual information, hub 130 may gather an initial radio-based count information indicative of the number of radio devices from that hub 130 can observe (e.g. receive) one or more signals and that are located in the part 160a of the venue 160. Thus, the coverage area of hub 130 may cover the part 160a of the venue 160.

Based on the visual count information and the initial radio-based count information, a correction information may for instance be determined (e.g. calculated), e.g. by the server 110. At hand, the determined correction information is indicative of a relation between a true number of persons residing at the part 160a of the venue 160 and the number of radio devices that are observable at this part 160a of the venue 160. For instance, as can be derived from the part 160a of FIG. 1, there are four persons residing in the part 160a, wherein only two of those four persons have the radio communication interfaces of their mobile terminals, at hand mobile terminals 150-12 and 150-13, turned on. Thus, the correction information may represent an average number of two persons per radio devices which have turned on the radio communication interfaces. This may also be referred to as "radio-on fraction".

Then, the server 110 may for instance receive a radio-based count information that was gathered e.g. by one of the radio nodes 140-1 and 140-2. The respective radio-based count information may for instance be transmitted from the respective radio node 140 to the hub 130 in a first step, and then from the hub 130 to the server 110 in a second step. The communication connection between the respective radio node 140 and the hub 130 may for instance be a wireless communication according to BT-, BLE-, and/or WLAN specification. The communication connection between the hub 130 and the server 110 may for instance be a wire-bound communication, e.g. via the internet, or according to LAN (Local Area Network) specification, in case the server 110 is deployed in the venue 160 as well (not shown in FIG. 1). For instance, in order to determine an occupancy information indicative of the occupancy of a number of persons residing at the part (either part 160b in case of radio-node 140-2, or part 160c in case of radio node 140-1) of the venue 160, the received radio-based count information is multiplied by the correction factor.

For instance, the radio node 140-2 may have gathered a radio-based count information representing one mobile terminal (at hand mobile terminal 150-9) residing in the part 160b that has the radio communication interface turned on. By multiplying this radio-based count information by the correction information, the occupancy information associated with the part 160b of the venue 160 is determined to represent the number of two persons residing in the part 160b of the venue 160.

For instance, the radio node 140-1 may have gathered a radio-based count information representing a number of three mobile terminals (at hand mobile terminals 150-1, 150-2, and 150-7) residing in the part 160c that have the radio communication interfaces turned on. By multiplying this radio-based count information by the correction information, the occupancy information associated with the part 160c of the venue 160 is determined to represent the number of six persons residing in the part 160c of the venue 160.

Each of the mobile terminals 150 may for instance comprise one or more means (e.g. a sensor, a transceiver, a receiver, a sender, or a combination thereof, e.g. a sender and a receiver, in the aforementioned description also referred to as radio communication interface) for a communication with the radio nodes 140, with the hub 130, with the server 110, e.g. via another communication network (not shown in FIG. 1, e.g. the Internet). The server 110 may for instance comprise one or more means (e.g. a transceiver, a receiver, a sender, or a combination thereof, e.g. a sender and a receiver) for a communication with the mobile devices 150, and/or the hub 130, e.g. via the cellular network 150, or via the Internet (not shown in FIG. 1), to name but a few non-limiting examples.

Communication between the mobile terminals 150, hub 130 and the server 110 may for instance take place at least partially in a wireless fashion, e.g. based on WLAN- and/or BT- and/or BLE-based communication, to name but a few non-limiting examples. Further, mobility of the mobile terminals 150 can be guaranteed by employing wireless-based communication.

Figure 2:
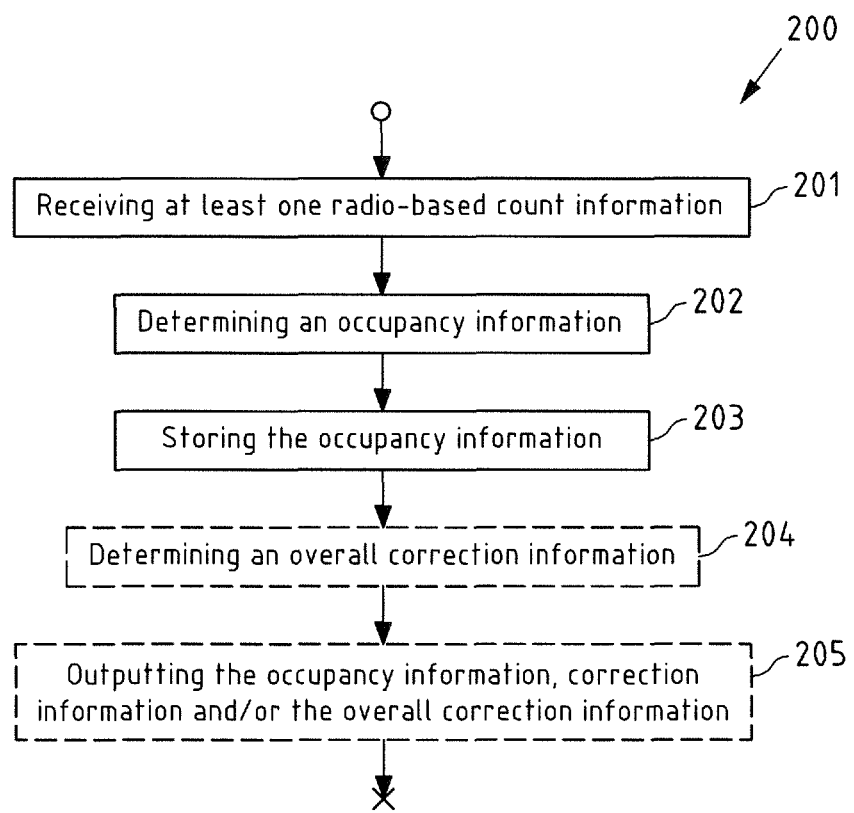
FIG. 2 a flow chart illustrating an example operation, e.g. in the at least one apparatus, e.g. according to FIG. 5, of an example method according to the first exemplary aspect of the present invention.
Figure 5:
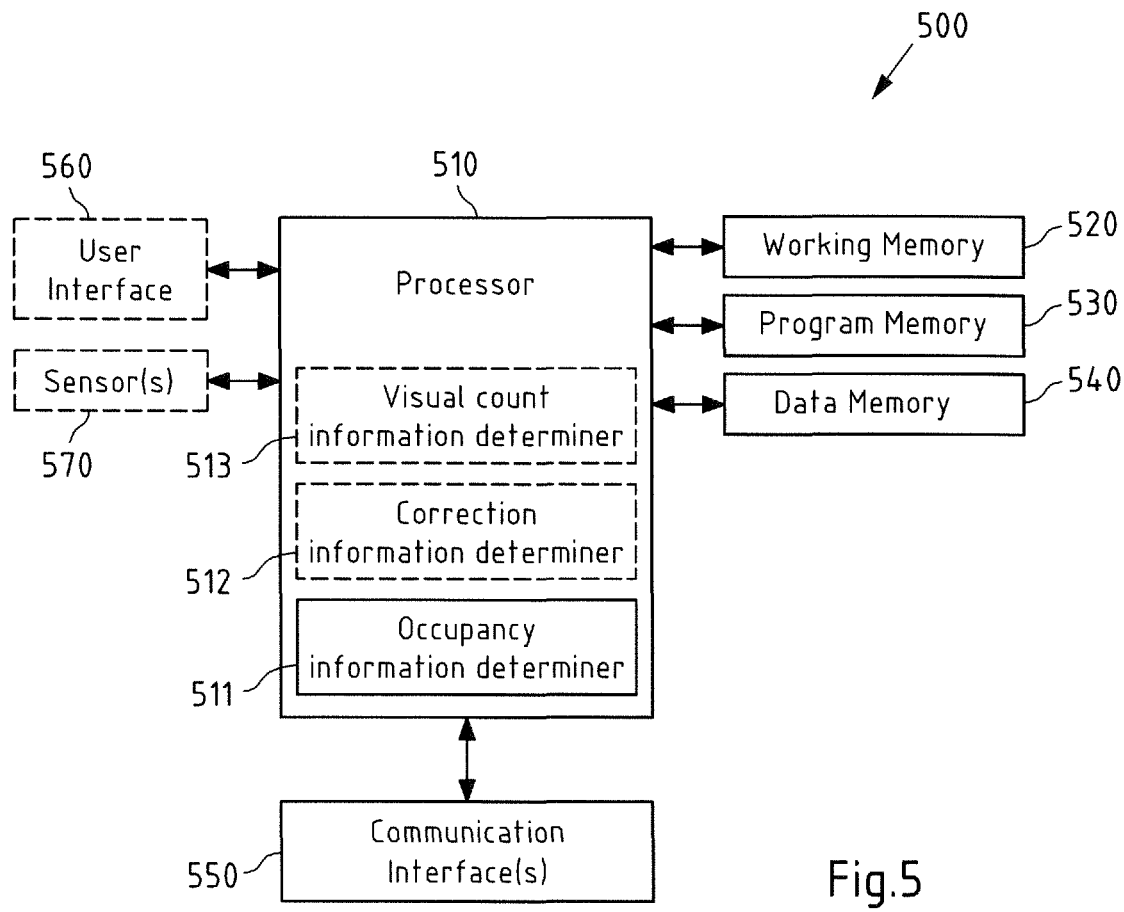
FIG. 5 a schematic block diagram of an example embodiment of an apparatus according to the present invention.

FIG. 2 shows a flow chart 200 illustrating an example operation, e.g. in the first apparatus, e.g. according to FIG. 5, of an example method according to the first exemplary aspect of the present invention.

This flow chart 200 may for instance be performed by a server or a server cloud, e.g. server 110 of FIG. 1.

In a first step 201, at least one radio-based count information is received. The at least one radio-based count information may for instance be gathered by at least one of the radio nodes 140 of FIG. 1. The at least one radio-based count information may for instance be received from the hub 130 of FIG. 1, since one of the radio nodes 140 of Fig.1 may for instance have output the at least one radio-based count information to the hub 130 of FIG. 1, which may then relay the radio-based count information to the server 110 so that it is received.

In a second step 202, an occupancy information is determined. The occupancy information is determined based at least partially on the received radio-based count information of step 201 and a correction factor that may for instance be determined based at least partially on at least one visual count information and at least one initial radio-based count information that are received prior to the determining of the correction factor.

In a third step 203, the occupancy information (determined in step 202, or alternatively received, e.g. from a hub (e.g. hub 130 of FIG. 1)) is stored, e.g. in a memory. Such a memory may for instance be comprised by the database 120 of FIG. 1.

In an optional fourth step 204, an overall correction information is determined. The overall correction information may for instance be associated with one specific venue, e.g. venue 160 of FIG. 1. The overall correction information may for instance be determined on a plurality of correction information that are determined based at least partially on a visual count information and an initial radio-based count information, wherein such pieces of visual count information and pieces of initial radio-based count information are gathered by different hubs deployed throughout one venue (e.g. venue 160). The determined overall correction information may then be stored, e.g. in the database 120.

In an optional fifth step 205, the occupancy information, correction information and/or the overall correction information that may for instance be stored, are outputted, e.g. in response to a request that is received. In this way, occupancy information, correction information and/or overall correction information can be provided as a service, e.g. enabling occupancy monitoring for a specific venue for that the occupancy information, correction information and/or the overall correction information are determined.

Figure 3:
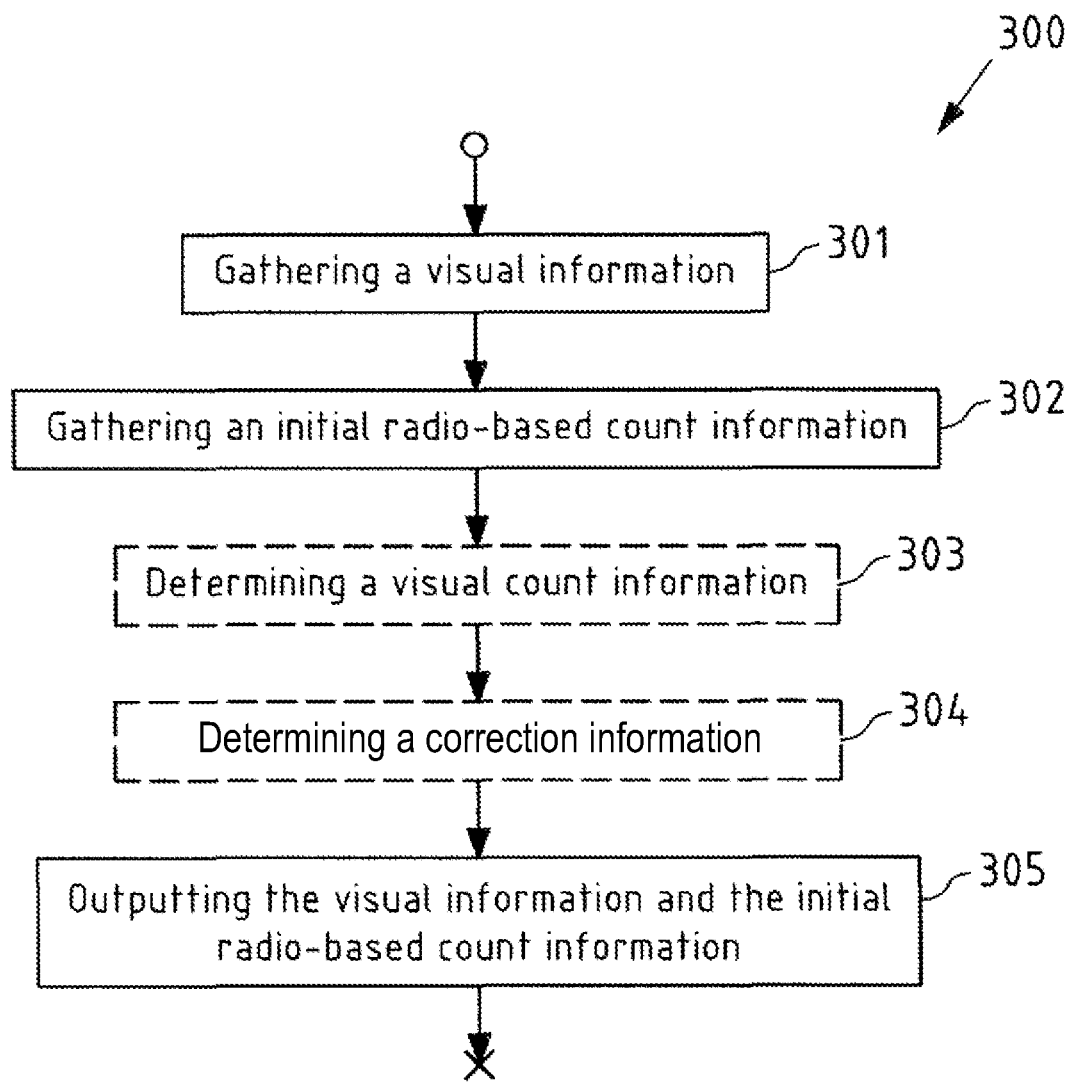
FIG. 3 a flow chart illustrating an example operation, e.g. in the at least one apparatus, e.g. according to FIG. 6, of an example method according to the second exemplary aspect of the present invention.
Figure 6:
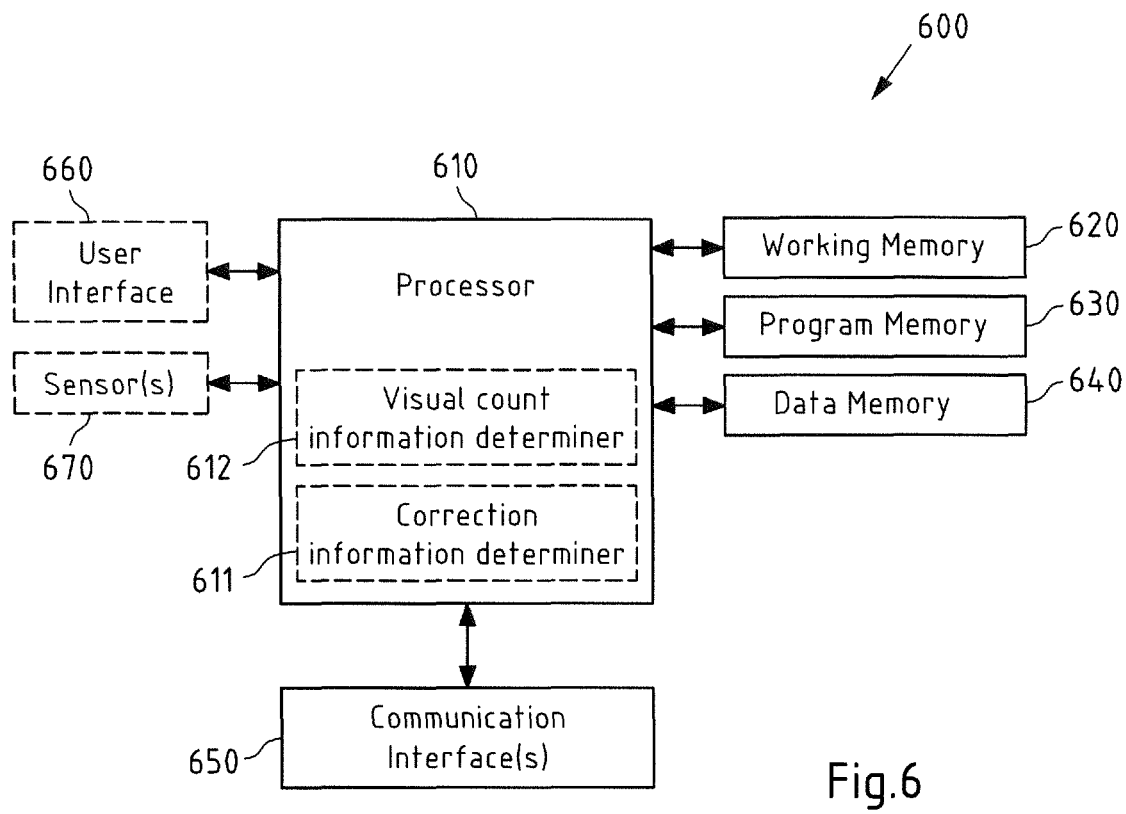
FIG. 6 a schematic block diagram of an example embodiment of another apparatus according to the present invention.

FIG. 3 shows a flow chart 300 illustrating an example operation, e.g. in the second apparatus, e.g. according to FIG. 6, of an example method according to the second exemplary aspect of the present invention.

This flow chart 300 may for instance be performed by a hub, e.g. hub 130 of FIG. 1.

In a first step 301, a visual information is gathered (e.g. by at least one optical sensor comprised by or connectable to the second apparatus (e.g. sensor 670 of apparatus 600).

In a second step 302, an initial radio-based count information is gathered. The gathering of the initial radio-based count information may for instance comprise an observing (e.g. measuring) of one or more (radio) signals that are transmitted by one or more radio devices (e.g. mobile terminals 150 of FIG. 1) residing within the certain part of the venue in that a coverage area between one or more radio devices and the hub is established, and then a determining of the number of radio devices (e.g. mobile terminals 150) based at least partially on the observed signals.

In an optional third step 303, a visual count information may for instance be determined based at least partially on the gathered visual information of step 301. In case the visual count information is not determined by the apparatus 300 in this optional step 303, the visual information gathered in step 301 is output, e.g. to the server 110.

In an optional fourth step 304, a correction information is determined. In case the correction information is not determined by the apparatus 300 in this optional step 304, the correction information may for instance be determined based at least partially on the output visual information and the initial radio-based count information of steps 301 and 302, or alternatively the determined visual count information and the initial radio-based count information of steps 303 and 302.

In a fifth step 305, the visual information and the initial radio-based count information are output. Further, in case the visual count information was determined in step 303, this visual count information may for instance be output alternatively or additionally to the visual information. In case the correction information was determined in step 304, this correction information may for instance be output as well. One or more of the aforementioned pieces of information may for instance be output to the server 110 of FIG. 1.

Figure 4:
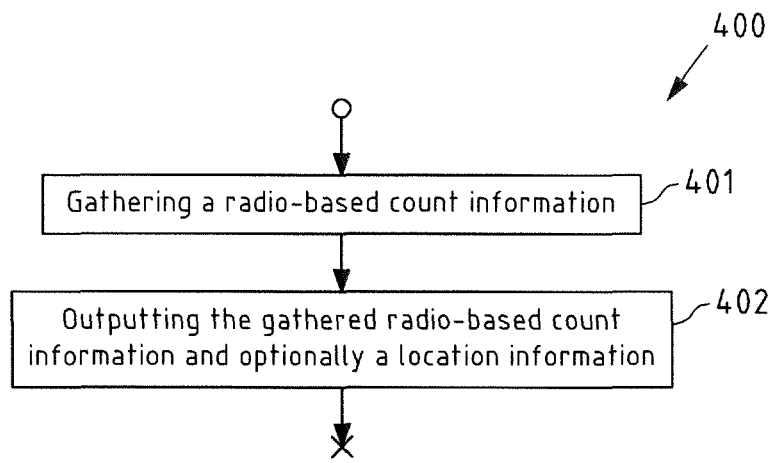
FIG. 4 a flow chart illustrating an example operation, e.g. in the at least one apparatus, e.g. according to FIG. 7, of an example method according to the third exemplary aspect of the present invention.
Figure 7:
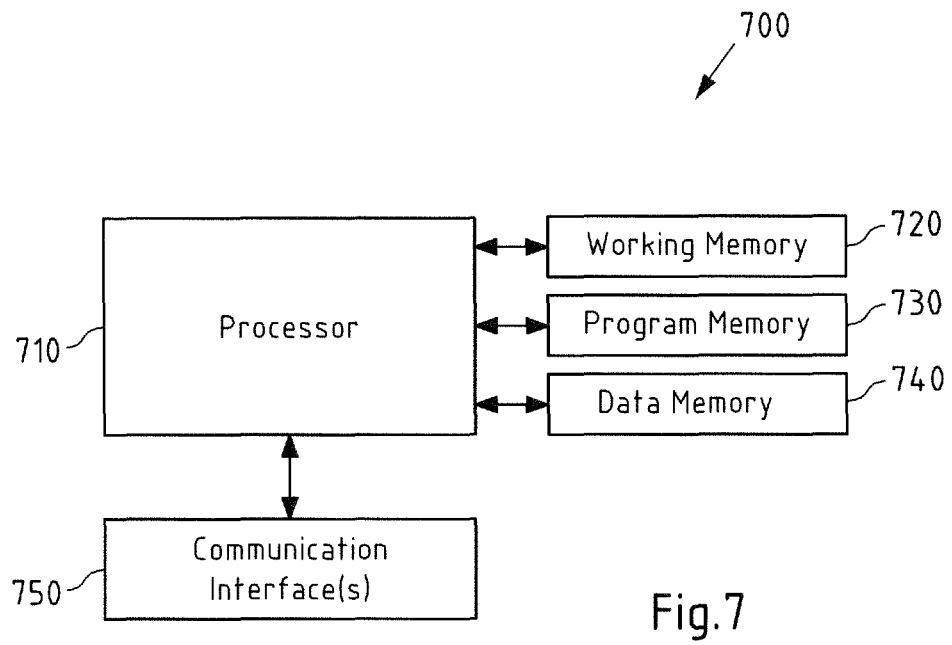
FIG. 7 a schematic block diagram of an example embodiment of another apparatus according to the present invention.

FIG. 4 shows a flow chart 400 illustrating an example operation, e.g. in the third apparatus, e.g. according to FIG. 7, of an example method according to the third exemplary aspect of the present invention.

This flow chart 400 may for instance be performed by a radio node, e.g. by at least one of the radio nodes 140-1 and 140-2 of FIG. 1.

In a first step 401, a radio-based count information is gathered. The gathering of the radio-based count information may for instance comprise an observing (e.g. measuring) of one or more (radio) signals that are transmitted by one or more radio devices (e.g. mobile terminals 150 of FIG. 1) residing within the certain part of the venue in that a coverage area between one or more radio devices and the radio node is established, and then a determining of the number of radio devices (e.g. mobile terminals 150) based at least partially on the observed signals.

In a second step 402, the radio-based count information is output. Optionally, a location information indicative of a location respectively position of the third apparatus in the venue is output as well. The radio-based count information may for instance be output to a hub deployed in the same venue in that radio node is deployed as well, e.g. hub 130 of FIG. 1.

FIG. 5 is a schematic block diagram of an apparatus 500 according to an exemplary aspect of the present invention, which may for instance represent the server 110 of FIG. 1.

Apparatus 500 comprises a processor 510, working memory 520, program memory 530, data memory 540, communication interface(s) 550, an optional user interface 560 and an optional sensor(s) 570.

Apparatus 500 may for instance be configured to perform and/or control or comprise respective means (at least one of 510 to 570) for performing and/or controlling the method according to the first exemplary aspect of the present invention. Apparatus 500 may as well constitute an apparatus comprising at least one processor (510) and at least one memory (520) including computer program code, the at least one memory and the computer program code configured to, with the at least one processor, cause an apparatus, e.g. apparatus 500 at least to perform and/or control the method according to the first exemplary aspect of the present invention.

Processor 510 may for instance comprise occupancy information determiner 511 as a functional and/or structural unit. Occupancy information determiner 511 may for instance be configured to determine an occupancy information (see step 202 of FIG. 2). Processor 510 may for instance comprise an optional correction information determiner 512 as a functional and/or structural unit. Correction information determiner 512 may for instance be configured to determine a correction information (see step 202 of FIG. 2, wherein the correction information is used for determining the occupancy information). Correction information determiner 512 may be mandatory, e.g. in case that apparatus 600 does not comprise such a correction information determiner. Processor 510 may for instance comprise an optional visual count information determiner 513 as a functional and/or structural unit. Visual count information determiner 513 may for instance be configured to determine a visual count information based at least partially on a received visual information. Processor 510 may for instance further control the memories 520 to 540, the communication interface(s) 550, the optional user interface 560 and the optional sensor(s) 570.

Processor 510 may for instance execute computer program code stored in program memory 530, which may for instance represent a computer readable storage medium comprising program code that, when executed by processor 510, causes the processor 510 to perform the method according to the first exemplary aspect of the present invention.

Processor 510 (and also any other processor mentioned in this specification) may be a processor of any suitable type. Processor 510 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 510 may for instance be an application processor that runs an operating system.

Program memory 530 may also be included into processor 510. This memory may for instance be fixedly connected to processor 510, or be at least partially removable from processor 510, for instance in the form of a memory card or stick. Program memory 530 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 530 may also comprise an operating system for processor 510. Program memory 530 may also comprise a firmware for apparatus 500.

Apparatus 500 comprises a working memory 520, for instance in the form of a volatile memory. It may for instance be a Random Access Memory (RAM) or Dynamic RAM (DRAM), to give but a few non-limiting examples. It may for instance be used by processor 510 when executing an operating system and/or computer program.

Data memory 540 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 540 may for instance store one or more pieces of occupancy information, one or more pieces of correction information, one or more pieces of overall correction information, to name but a few non-limiting examples.

Communication interface(s) 550 enable apparatus 500 to communicate with other entities, e.g. with hub 130 of FIG. 1. The communication interface(s) 550 may for instance comprise a wireless interface, e.g. a cellular radio communication interface and/or a WLAN, BT and/or BLE interface and/or wire-bound interface, e.g. an IP-based interface, for instance to communicate with entities, e.g. via the Internet.

User interface 560 is optional and may comprise a display for displaying information to a user and/or an input device (e.g. a keyboard, keypad, touchpad, mouse, etc.) for receiving information from a user.

Sensor(s) 570 are optional and may for instance comprise a temperature sensor, to name but one non-limiting example.

Some or all of the components of the apparatus 500 may for instance be connected via a bus. Some or all of the components of the apparatus 500 may for instance be combined into one or more modules.

FIG. 6 is a schematic block diagram of an apparatus 600 according to an exemplary aspect of the present invention, which may for instance represent hub 130 of FIG. 1.

Apparatus 600 comprises a processor 610, working memory 620, program memory 630, data memory 640, communication interface(s) 650, an optional user interface 660 and an optional sensor(s) 670.

Apparatus 600 may for instance be configured to perform and/or control or comprise respective means (at least one of 610 to 670) for performing and/or controlling the method according to the second exemplary aspect of the present invention. Apparatus 600 may as well constitute an apparatus comprising at least one processor (610) and at least one memory (620) including computer program code, the at least one memory and the computer program code configured to, with the at least one processor, cause an apparatus, e.g. apparatus 600 at least to perform and/or control the method according to the second exemplary aspect of the invention of the present invention.

Processor 610 may for instance comprise an optional correction information determiner 611 as a functional and/or structural unit. Correction determiner 611 may for instance be configured to determine a correction information (see step 304 of FIG. 3). Processor 610 may for instance comprise an optional visual count information determiner 612 as a functional and/or structural unit. Visual count information determiner 612 may for instance be configured to determine a visual count information (see step 304 of FIG. 3) based at least partially on a visual information, e.g. gathered by an optical sensor 670. Processor 610 may for instance further control the memories 620 to 640, the communication interface(s) 650, the optional user interface 660 and the optional sensor(s) 670.

Processor 610 may for instance execute computer program code stored in program memory 630, which may for instance represent a computer readable storage medium comprising program code that, when executed by processor 610, causes the processor 610 to perform the method according to the second exemplary aspect of the present invention.

Processor 610 (and also any other processor mentioned in this specification) may be a processor of any suitable type. Processor 610 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 610 may for instance be an application processor that runs an operating system.

Program memory 630 may also be included into processor 610. This memory may for instance be fixedly connected to processor 610, or be at least partially removable from processor 610, for instance in the form of a memory card or stick. Program memory 630 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 630 may also comprise an operating system for processor 610. Program memory 630 may also comprise a firmware for apparatus 600.

Apparatus 600 comprises a working memory 620, for instance in the form of a volatile memory. It may for instance be a Random Access Memory (RAM) or Dynamic RAM (DRAM), to give but a few non-limiting examples. It may for instance be used by processor 610 when executing an operating system and/or computer program.

Data memory 640 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 640 may for instance store one or more pieces of visual count information, one or more pieces of correction information, one or more pieces of visual information, one or more pieces of initial radio-based count information, and/or one or more pieces of radio-based count information. For instance, one or more pieces of visual count information, one or more pieces of initial radio-based count information, one or more pieces of radio-based count information may be stored prior to the outputting (see step 305 of FIG. 3).

Communication interface(s) 650 enable apparatus 600 to communicate with other entities, e.g. with the radio nodes 140 of FIG. 1, with all of the mobile terminals 150 of FIG. 1, and in particular with the server 110 of FIG. 1. The communication interface(s) 650 may for instance comprise a wireless interface, e.g. a cellular radio communication interface and/or a WLAN interface) and/or wire-bound interface, e.g. an IP-based interface, for instance to communicate with entities.

User interface 660 is optional and may comprise a display for displaying information to a user and/or an input device (e.g. a keyboard, keypad, touchpad, mouse, etc.) for receiving information from a user.

Sensor(s) 670 are optional and may for instance comprise at least one optical sensor, e.g. to gather a visual information.

Some or all of the components of the apparatus 600 may for instance be connected via a bus. Some or all of the components of the apparatus 600 may for instance be combined into one or more modules.

FIG. 7 is a schematic block diagram of an apparatus 700 according to an exemplary aspect of the present invention, which may for instance represent radio node 140 of FIG. 1.

Apparatus 700 comprises a processor 710, working memory 720, program memory 730, data memory 740, and communication interface(s) 750.

Apparatus 700 may for instance be configured to perform and/or control or comprise respective means (at least one of 710 to 750) for performing and/or controlling the method according to the third exemplary aspect of the present invention. Apparatus 700 may as well constitute an apparatus comprising at least one processor (710) and at least one memory (720) including computer program code, the at least one memory and the computer program code configured to, with the at least one processor, cause an apparatus, e.g. apparatus 700 at least to perform and/or control the method according to the third exemplary aspect of the invention of the present invention.

Processor 710 may for instance further control the memories 720 to 740, and the communication interface(s) 750.

Processor 710 may for instance execute computer program code stored in program memory 730, which may for instance represent a computer readable storage medium comprising program code that, when executed by processor 710, causes the processor 710 to perform the method according to the third exemplary aspect of the present invention.

Processor 710 (and also any other processor mentioned in this specification) may be a processor of any suitable type. Processor 710 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 710 may for instance be an application processor that runs an operating system.

Program memory 730 may also be included into processor 710. This memory may for instance be fixedly connected to processor 710, or be at least partially removable from processor 710, for instance in the form of a memory card or stick. Program memory 730 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 730 may also comprise an operating system for processor 710. Program memory 730 may also comprise a firmware for apparatus 700.

Apparatus 700 comprises a working memory 720, for instance in the form of a volatile memory. It may for instance be a Random Access Memory (RAM) or Dynamic RAM (DRAM), to give but a few non-limiting examples. It may for instance be used by processor 710 when executing an operating system and/or computer program.

Data memory 740 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 740 may for instance store one or more pieces of radio-based count information (see step 401 of FIG. 4).

Communication interface(s) 750 enable apparatus 700 to communicate with other entities, e.g. with hub 130 of FIG. 1, and in particular with all of the mobile terminals 150 of FIG. 1. The communication interface(s) 750 may for instance comprise a wireless interface, e.g. a cellular radio communication interface and/or a WLAN interface) and/or wire-bound interface, e.g. an IP-based interface.

Some or all of the components of the apparatus 700 may for instance be connected via a bus. Some or all of the components of the apparatus 700 may for instance be combined into one or more modules.

The following embodiments shall also be considered to be disclosed:

Radio-based sensing is a tempting approach, when an indoor positioning system with beacon management respectively monitoring is deployed to a venue. In that case there are hubs and beacons that can sense radio transmissions. However, before this approach can produce reliable results, the fraction of employees with Wi-Fi and/or Bluetooth turned on must be measured. This functionality can be added easily to the hubs, which are already connected to the management respectively monitoring backend. Thus, there is no need for e.g. extra connectivity arrangements.

An exemplary embodiment of an indoor positioning system (e.g. a system according to the fourth exemplary aspect of the present invention) may for instance comprise, among other things:

Beacon monitoring hubs of the indoor positioning system are equipped with a light/infrared/camera sensor(s) and a Wi-Fi/Bluetooth radio(s)

System records the true number of persons in a space with light/infrared/camera sensors System records the number of persons with Wi-Fi and/or Bluetooth radio on in their mobile device System learns the fraction of people that have radio(s) on in their mobile device The said fraction can be per venue, or e.g. per floor or department An exemplary embodiment of an occupancy monitoring system that
Uses cheap radio nodes that sense radio signals (Wi-Fi/ Bluetooth) and relay the number of observed radio sources to the hub(s), which further relay(s) the information to an e.g. analytics server(s)
Corrects the numbers (for instance, the number of observed mobile devices with the radio on) with the said fraction to obtain the true number of people in space(s)

In FIG. 1, an exemplary embodiment of a system according to the fourth exemplary aspect of the present invention is shown.

The system comprises several beacons (e.g. beacon 140) deployed in the venue (e.g. venue 160) to support indoor positioning. There may be e.g. one beacon in each conference room, then more along the corridors etc.

The beacons are in contact with a hub (e.g. hub 130) that provides e.g. capability to monitor the beacon battery levels. The hub is connected to a server (e.g. server 110) that provides a web frontend for visualizing monitoring status (e.g. of the beacons).

Further, the hub is equipped with a camera/infrared/light sensor that allows deducing the true number of persons in the hub's vicinity. Also, as described above, the hub also senses the number of mobile radios in the vicinity using Bluetooth/Wi-Fi radio(s). This information (number of persons and number of radio sources) is relayed to the server to model the fraction of persons with the Bluetooth/Wi-Fi radio turned on in their mobile devices.

There may typically be multiple of such hubs deployed in a venue. Therefore, the server receives the information for modeling from multiple such hubs. The combining component can then decide, whether to combine all the information as a single venue-wide fraction, and/or to have separate fractions for e.g. each floor or predefined area of the venue.

The devices that have turned their radio (e.g. Wi-Fi, and/or Bluetooth) on, also referred to as "radio-on fraction", allows the usage of cheap beacons with the radio reception capability to be used for collecting detailed occupancy information on e.g. room level. Hubs can be expensive components providing multiple functions, in contrast beacons are cheap devices that can be deployed at high density at low cost. The beacons monitor the radio environment, and relay this information to the hub that further relays the information to the occupancy monitoring server for analysis.

As the final step, the analysis server combines the information about the observed mobile radio devices from beacons with the understanding of the "radio-fraction". This step produces statistically accurate information on the number of persons in the space. To make this work, the system may for instance know the beacon locations, e.g. in which room each beacon is.

In FIG. 1, a schematic illustration of an exemplary system architecture of a system according to the fourth exemplary aspect of the present invention is shown.

The hub is connected to the occupancy monitoring server. The hub provides the server information on the number of radio sources and the number of persons in space. The server then models the "radio-on fraction" as "the number of mobile radio sources per number of persons". The radio beacons located in the room A and room B report the number of mobile radio sources to the server (via hub). The server then estimates the number of persons in each room based on the number of radio sources and the "radio-on fraction".

Further, there may be alternative ways to create connections to the (occupancy monitoring) server, e.g. mesh networking between beacons. Also, an alternatively implementation is to equip some of the beacons with light/infrared/camera capabilities to produce "true" information, and then to have the rest (majority) of the beacons to collect just radio data.

In this way, an accurate occupancy monitoring system at practically no added cost, when an indoor positioning system is deployed in a venue, can be achieved.

Embodiment 1

A first method, comprising:
receiving at least one radio-based count information indicative of a number of radio devices residing at a venue or a part thereof;
determining an occupancy information indicative of an occupancy of a number of persons residing at the venue or a part thereof, wherein the occupancy information is determined based at least partially on the radio-based count information and a correction information indicative of a relation between a true number of persons residing at the venue or a part thereof and the number of radio devices observable at the venue or a part thereof, wherein the correction information represents a ratio of a number of radio devices that have turned their radio communication interfaces on per persons residing at the venue or a part thereof; and
storing the occupancy information.

Embodiment 2

The method according to embodiment 1, wherein the correction information is determined based at least partially on a visual count information indicative of a number of persons residing at the venue or a part thereof and an initial radio-based count information indicative of a number of radio devices residing at the venue or the part thereof.

Embodiment 3

The method according to embodiment 1 or embodiment 2, wherein the occupancy information represents one or more occupancies, wherein each occupancy of the one or more occupancies is associated with at least a part of the venue.

Embodiment 4

The method according to any of the embodiments 1 to 3, wherein an overall correction information may for instance be determined based, at least partially, on the plurality of pieces of correction information that are associated with the venue.

Embodiment 5

The method according to any of the embodiments 1 to 4, wherein a location information is received together with the radio-based count information, wherein the location information is indicative of a location of an apparatus of the venue from that the at least one radio-based count information is received.

Embodiment 6

The method according to any of the embodiments 1 to 5, wherein the visual count information and the initial radio-based count information are received from an apparatus that gathered a visual information and the initial radio-based count information prior to the receiving of the visual count information and the initial radio-based count information, or wherein a visual information and the initial radio-based count information are received from an apparatus that gathered the visual information and the initial radio-based count information prior to the receiving of the visual information and the initial radio-based count information, and wherein the visual count information is determined based at least partially on the received visual information.

Embodiment 7

The method according to any of the embodiments 1 to 6, wherein the determined occupancy information is output.

Embodiment 8

The method according to any of the embodiments 1 to 7, wherein a plurality of pieces of correction information are determined, wherein each of the plurality of pieces of correction information are determined based on a respective visual count information indicative of a number of persons residing at a venue or a part thereof, and a respective an initial radio-based count information indicative of a number of radio devices residing at the venue or a part thereof.

Embodiment 9

The method according to any of the embodiments 1 to 8, wherein the method is performed and/or controlled by or by a part of a server or a server cloud.

Embodiment 10

A second method, comprising:
gathering a visual information indicative of a number of persons residing at a venue or a part thereof;
gathering an initial radio-based count information indicative of a number of radio devices residing at the venue or a part thereof;
outputting the visual information and the initial radio-based count information.

Embodiment 11

The method according to embodiment 10, further comprising:
determining a correction information indicative of a relation between the true number of persons residing at the venue or a part thereof and the number of radio devices observable at the venue or a part thereof, wherein the correction information represents a ratio of a number of radio devices that have turned their radio communication interfaces on per persons residing at the venue or a part thereof.

Embodiment 12

The method according to embodiment 10 or embodiment 11, wherein the visual information is gathered by at least one optical sensor.

Embodiment 13

The method according to any of the embodiments 10 to 12, wherein the initial radio-based count information is gathered by at least one communication interface according to Wi-Fi and/or Bluetooth communication standard.

Embodiment 14

The method according to any of the embodiments 10 to 13, wherein the method is performed and/or controlled by a wire-based and/or wireless hub, or radio node (e.g. comprising the at least one optical sensor).

Embodiment 15

A third method, comprising:
gathering a radio-based count information indicative of a number of radio devices residing at a venue or a part thereof; and
outputting the gathered radio-based count information.

Embodiment 16

The method according to embodiment 15, wherein a location information indicative of the location of the third apparatus of the venue is outputted together with the gathered radio-based count information.

Embodiment 17

The method according to embodiment 15 or embodiment 16, wherein the initial radio-based count information is gathered by at least one communication interface according to Wi-Fi and/or Bluetooth communication standard.

Embodiment 18

The method according to any of the embodiments 15 to 17, wherein the method is performed and/or controlled by a radio node according to the Bluetooth and/or Wi-Fi communication standard.

Embodiment 19

A first apparatus comprising at least one processor and at least one memory including computer program code, the at least one memory and the computer program code configured to, with the at least one processor, cause the first apparatus to at least perform the steps of the method of any of the embodiments 1 to 9.

Embodiment 20

A second apparatus comprising at least one processor and at least one memory including computer program code, the at least one memory and the computer program code configured to, with the at least one processor, cause the second apparatus to at least perform the steps of the method of any of the embodiments 10 to 14.

Embodiment 21

A third apparatus comprising at least one processor and at least one memory including computer program code, the at least one memory and the computer program code configured to, with the at least one processor, cause the second apparatus to at least perform the steps of the method of any of the cl embodiments aims 15 to 18.

Embodiment 22

A first apparatus configured to perform and/or control or comprising respective means for performing and/or controlling the first method of any of the embodiments 1 to 9.

Embodiment 23

A second apparatus configured to perform and/or control or comprising respective means for performing and/or controlling the second method of any of the embodiments 10 to 14.

Embodiment 24

A third apparatus configured to perform and/or control or comprising respective means for performing and/or controlling the third method of any of the embodiments 15 to 18.

Embodiment 25

A first computer program, the computer program when executed by a processor causing an apparatus to perform and/or control the actions of the first method according to any of the embodiments 1 to 9.

Embodiment 26

A second computer program, the computer program when executed by a processor causing an apparatus to perform and/or control the actions of the second method according to any of the embodiments 10 to 14.

Embodiment 27

A third computer program, the computer program when executed by a processor causing an apparatus to perform and/or control the actions of the third method according to any of the embodiments 15 to 18.

Embodiment 28

A first tangible computer-readable medium storing computer program code, the computer program code when executed by a processor causing an apparatus to perform and/or control the actions of the first method according to any of the embodiments 1 to 9.

Embodiment 29

A second tangible computer-readable medium storing computer program code, the computer program code when executed by a processor causing an apparatus to perform and/or control the actions of the second method according to any of the embodiments 10 to 14.

Embodiment 30

A third tangible computer-readable medium storing computer program code, the computer program code when executed by a processor causing an apparatus to perform and/or control the actions of the third method according to any of the embodiments 15 to 18.

Embodiment 31

A system, comprising:
at least one first apparatus according to embodiment 19 or 22, which is configured to perform and/or control the method according to any of the embodiments 1 to 9;
at least one second apparatus according to embodiment 20 or 23, which is configured to perform and/or control the method according to any of the embodiments 1 to 9; and
at least one third apparatus according to embodiment 21 or 24, which is configured to perform and/or control the method according to any of the embodiments 1 to 9.

Embodiment 32

A system, comprising:
at least one first apparatus according to any of the embodiments 19 or 22;
at least one second apparatus according to any of the embodiments 20 or 23;
at least one third apparatus according to any of the embodiments 21 or 24.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A first apparatus comprising at least one processor and at least one memory including computer program code, the at least one memory and the computer program code configured to, with the at least one processor, cause the apparatus to at least perform:
receiving at least one radio-based count information indicative of a number of radio devices residing at a venue or a part thereof;
obtaining a plurality of pieces of correction information, each of the plurality of pieces of correction information associated with a respective predefined area of the venue;
determining, based at least in part on the plurality of pieces of correction information, whether to determine (a) a correction information comprising a venue-wide correction information or (b) a correction information comprising predefined area-specific correction information;
determining an occupancy information indicative of an occupancy of a number of persons residing at the venue or a part thereof, wherein the occupancy information is determined based at least partially on the radio-based count information and the correction information indicative of a relation between a true number of persons residing at the venue or a respective predefined area thereof and the number of radio devices observable at the venue or a respective predefined area thereof, wherein the correction information represents a ratio of a number of radio devices that have turned their radio communication interfaces on per persons residing at the venue or a respective predefined area thereof and, when the correction information comprises predefined area-specific correction information, the occupancy information is determined based at least partially on the correction information corresponding to a predefined area of the venue and the occupancy information corresponding to a part of the venue located within the predefined area; and
storing the occupancy information.

2. The first apparatus according to claim 1, wherein the correction information is determined based at least partially on a visual count information indicative of a number of persons residing at the venue or a part thereof and an initial radio-based count information indicative of a number of radio devices residing at the venue or the part thereof.

3. The first apparatus according to claim 2, wherein the visual count information and the initial radio-based count information are received from an apparatus that gathered a visual information and the initial radio-based count information prior to the receiving of the visual count information and the initial radio-based count information, and wherein the visual count information is determined based at least partially on the received visual information.

4. The first apparatus according to claim 2, wherein a visual information and the initial radio-based count information are received from an apparatus that gathered the visual information and the initial radio-based count information prior to the receiving of the visual information and the initial radio-based count information by the first apparatus.

5. The first apparatus according to claim 1, wherein the occupancy information represents one or more occupancies, wherein each occupancy of the one or more occupancies is associated with at least a part of the venue.

6. The first apparatus according to claim 1, further comprising:
responsive to determining to determine the correction information comprising the venue-wide correction information, determining the venue-wide correction information based at least in part on the plurality of pieces of correction information; and
responsive to determining to determine the correction information comprising the predefined area-specific correction information, determining the predefined area-specific correction information corresponding to a respective predefined area of the venue based at least in part on one or more pieces of correction information of the plurality of pieces of correction information corresponding to the respective predefined area.

7. The first apparatus according to claim 1, wherein a location information is received together with the radio-based count information, wherein the location information is indicative of a location of an apparatus of the venue from that the at least one radio-based count information is received.

8. The first apparatus according to claim 1, wherein a plurality of pieces of correction information are determined, and wherein each of the plurality of pieces of correction information are determined based on a respective visual count information indicative of a number of persons residing at a venue or a part thereof, and a respective initial radio-based count information indicative of a number of radio devices residing at the venue or a part thereof.

9. A second apparatus comprising at least one optical sensor, a communication interface configured to detect radio signals, at least one processor, and at least one memory including computer program code, the at least one memory and the computer program code configured to, with the at least one processor, cause the apparatus to at least perform:
gathering, via the at least one optical sensor a visual information indicative of a true number of persons residing at a venue or a part thereof;
gathering, via the communication interface, an initial radio-based count information indicative of a number of radio devices residing at the venue or a part thereof; and
outputting the visual information and the initial radio-based count information in association with location information indicative of a respective predefined area of the venue within which the second apparatus is located,
wherein the visual information and the initial radio-based count information are configured to be used to determine a venue-wide correction information and a predefined area-specific correction information.

10. The second apparatus according to claim 9, wherein the at least one memory and the computer program code are configured to, with the at least one processor, cause the second apparatus further to perform:

determining a correction information indicative of a relation between the true number of persons residing at the venue or a part thereof and the number of radio devices observable at the venue or a part thereof, wherein the correction information represents a ratio of a number of radio devices that have turned their radio communication interfaces on per persons residing at the venue or a part thereof.

11. The second apparatus according to claim 9, wherein the visual information is gathered by at least one optical sensor.

12. A method, comprising:

receiving at least one radio-based count information indicative of a number of radio devices residing at a venue or a part thereof;

obtaining a plurality of pieces of correction information, each of the plurality of pieces of correction information associated with a respective predefined area of the venue;

determining, based at least in part on the plurality of pieces of correction information, whether to determine (a) a correction information comprising a venue-wide correction information or (b) a correction information comprising predefined area-specific correction information;

determining an occupancy information indicative of an occupancy of a number of persons residing at the venue or a part thereof, wherein the occupancy information is determined based at least partially on the radio-based count information and the correction information indicative of a relation between a true number of persons residing at the venue or a respective predefined area thereof and the number of radio devices observable at the venue or a respective predefined area thereof, wherein the correction information represents a ratio of a number of radio devices that have turned their radio communication interfaces on per persons residing at the venue or a respective predefined area thereof and, when the correction information comprises predefined area-specific correction information, the occupancy information is determined based at least partially on the correction information corresponding to a predefined area of the venue and the occupancy information corresponding to a part of the venue located within the predefined area; and storing the occupancy information.

13. The method according to claim 12, wherein the correction information is determined based at least partially on a visual count information indicative of a number of persons residing at the venue or a part thereof and an initial radio-based count information indicative of a number of radio devices residing at the venue or the part thereof.

14. The method according to claim 13, wherein the visual count information and the initial radio-based count information are received from an apparatus that gathered a visual information and the initial radio-based count information prior to the receiving of the visual count information and the initial radio-based count information, and wherein the visual count information is determined based at least partially on the received visual information.

15. The method according to claim 13, wherein a visual information and the initial radio-based count information are received from an apparatus that gathered the visual information and the initial radio-based count information prior to the receiving of the visual information and the initial radio-based count information.

16. The method according to claim 12, wherein the occupancy information represents one or more occupancies, wherein each occupancy of the one or more occupancies is associated with at least a part of the venue.

17. The method according to claim 12, wherein an overall correction information is determinable based, at least partially, on the plurality of pieces of correction information that are associated with the venue.

18. The method according to claim 12, wherein a location information is received together with the radio-based count information, wherein the location information is indicative of a location of an apparatus of the venue from that the at least one radio-based count information is received.

19. The method according to claim 12, wherein a plurality of pieces of correction information are determined, wherein each of the plurality of pieces of correction information are determined based on a respective visual count information indicative of a number of persons residing at a venue or a part thereof, and a respective initial radio-based count information indicative of a number of radio devices residing at the venue or a part thereof.

20. The method according to claim 12, wherein the method is performed or controlled by or by a part of a server or a server cloud.

* * * * *